Feb. 21, 1967 G. J. FAN 3,305,669
OPTICAL DATA PROCESSING DEVICE
Filed Dec. 31, 1962 5 Sheets-Sheet 1
FIG. 1
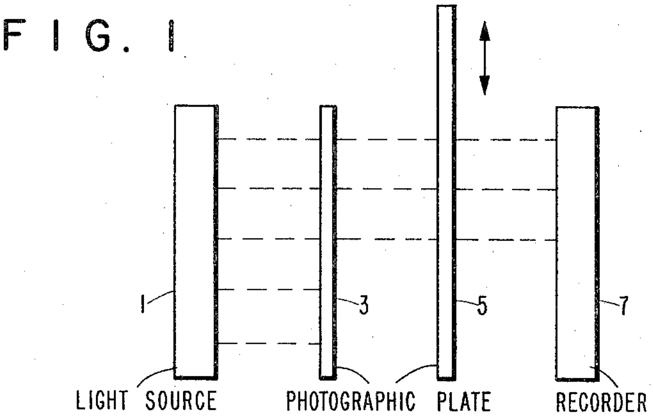
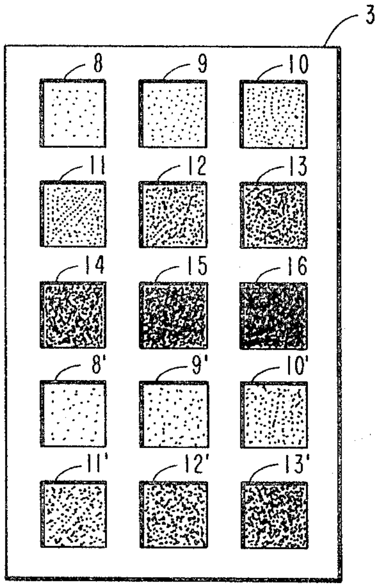
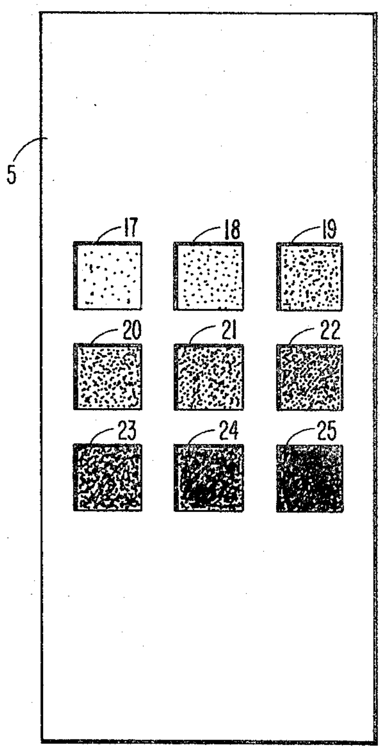
FIG. 2a
FIG. 2b
INVENTOR
GEORGE J. FAN
BY Thomas & Crickenberger
ATTORNEYS 3,305,669
Patented Feb. 21, 1967

3,305,669

OPTICAL DATA PROCESSING DEVICE

George J. Fan, Briarcliff, N.Y., assignor to International Business Machines Corporation, New York, N.Y., a corporation of New York Filed Dec. 31, 1962, Ser. No. 248,577
4 Claims. (Cl. 235—61.6)

This invention relates to optical data processing devices and more particularly to such devices utilized to perform matrical calculations.

In pure and applied mathematics there are many instances where arrays of numbers or functions must be manipulated. For example, in solving a simultaneous equation relating to a business or scientific problem, the principles of matrix algebra are applicable. Arithmetic manipulations on matrices of the order of 150 to 200 elements per side is about the maximum size which digital computers can handle with convenience and efficiency because the internal memory storage capacity of such computers is a major limiting factor. That is, matrices on the order of 1000 to 10,000 elements per side, encountered in solving many present day problems, become impracticable to program in even the largest digital computers. Accordingly, this invention is directed to a device for readily manipulating such extremely large matrices.

It is a feature of this invention to provide an optical data processing device for performing arithmetic manipulations on matrices.

It is a feature of this invention to provide an optical data processing device for multiplying one matrix by another.

It is another object of this invention to provide an optical data processing device for performing arithmetic manipulations on matrices wherein said operations may be performed with nominal program control.

It is a further feature of this invention to provide an optical data processing device for performing matrix arithmetic operation wherein the device is fast, reliable and easy to operate.

In one arrangement according to this invention multiplication of two matrices A and B is performed which yields matrix C. Matrix A is made on an optical memory sheet or photograph by orienting dots of information in an "*n* x *n*" configuration, preferably a square or rectangular configuration. The memory sheet or photographic plate is made by exposing each dot of information to a light intensity proportional to the numeric value of the matrix element it represents. After the photographic plate is developed, the optical transparency of each dot varies in proportion to the numeric value of the matrix element it represents. The matrix B is fabricated in like fashion. Normally, an element in matrix C is found by summing the products obtained by multiplying a group of individual column elements in matrix B by a group of individual row elements in matrix A. For example, $C_{11}=A_{11}B_{11}+A_{12}B_{21}+A_{13}B_{31} \ldots A_{1n}B_{1n}$. However, the column elements in the usual matrix B are oriented and arranged on the optical sheet to lie along rows and thereby register with the row elements of matrix A. That is, element $A_{11}$ initially coincides with $B_{11}$; $A_{12}$ initially coincides with $B_{21}$; $A_{13}$ initially coincides with $B_{31}$ and so forth. The two matrices are superimposed on one another and light passes through both of the corresponding elements of each optical sheet. Light emerging from the first row relates to element $C_{11}$, the second row $C_{22}$, the third row $C_{33}$ and so forth. Thus, the major diagonal elements of the matrix C are obtained by using a light summation device such as a cylindrical lense on the opposite side of the A and B matrices. After recording all of the C elements obtained from the present position of the two matrices, the B matrix is permuted to generate the off-diagonal elements of the matrix C. More specifically, the rows of the A and B matrices are displaced relative to another, and the foregoing multiplication process is repeated to generate the remaining elements of matrix C. Because of the permutation of one matrix relative to the other, a portion of one of the matrices will appear twice on its optical sheet. For purposes of illustration herein, the B matrix is permuted, and a portion of the A matrix appears twice on its optical sheet. The complete C matrix can be determined after *n* permutations. An arrangement of this type may be employed to perform matrix addition and multiplication.

The following and other objects, features and advantages of the invention will be apparent from the following more particular description of a preferred embodiment of the invention, as illustrated in the accompanying drawings.

In the drawings:

FIG. 1 illustrates the general aspects of the present invention.

FIGS. 2*a* and 2*b* illustrate photographic plates having storage areas disposed thereon which represent the mathematical quantities of matrices by variations in light transparency.

Figure 3:
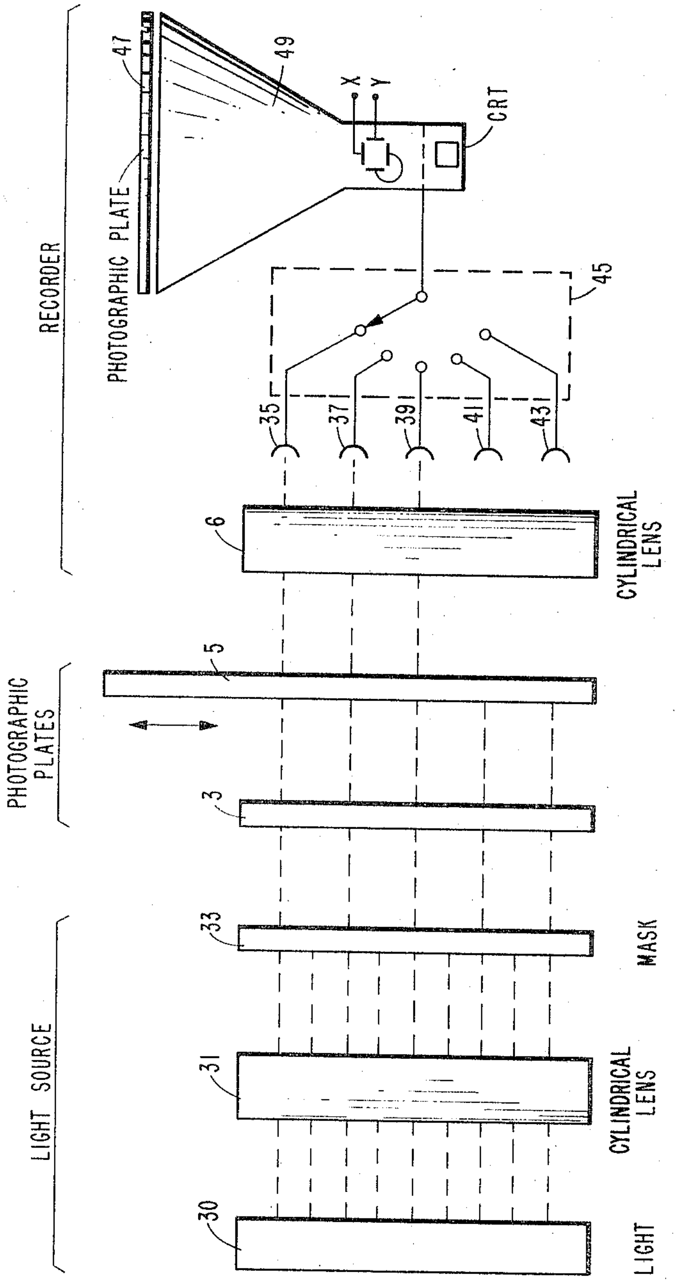
FIG. 3 illustrates, partly in block schematic form, one arrangement according to this invention.
Figure 6:
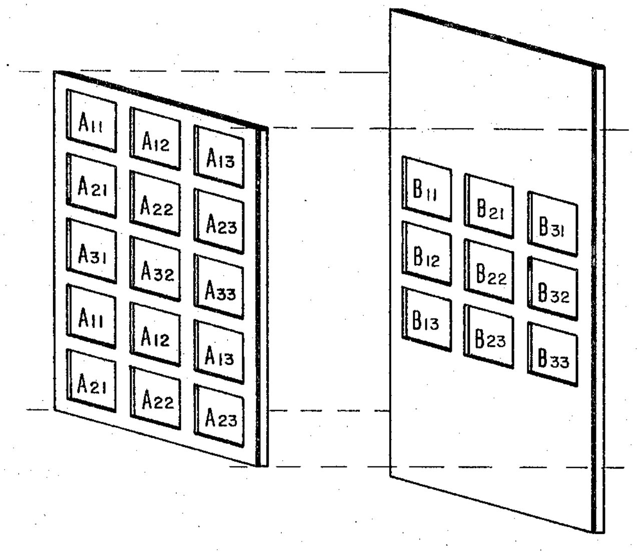
Figure 5:
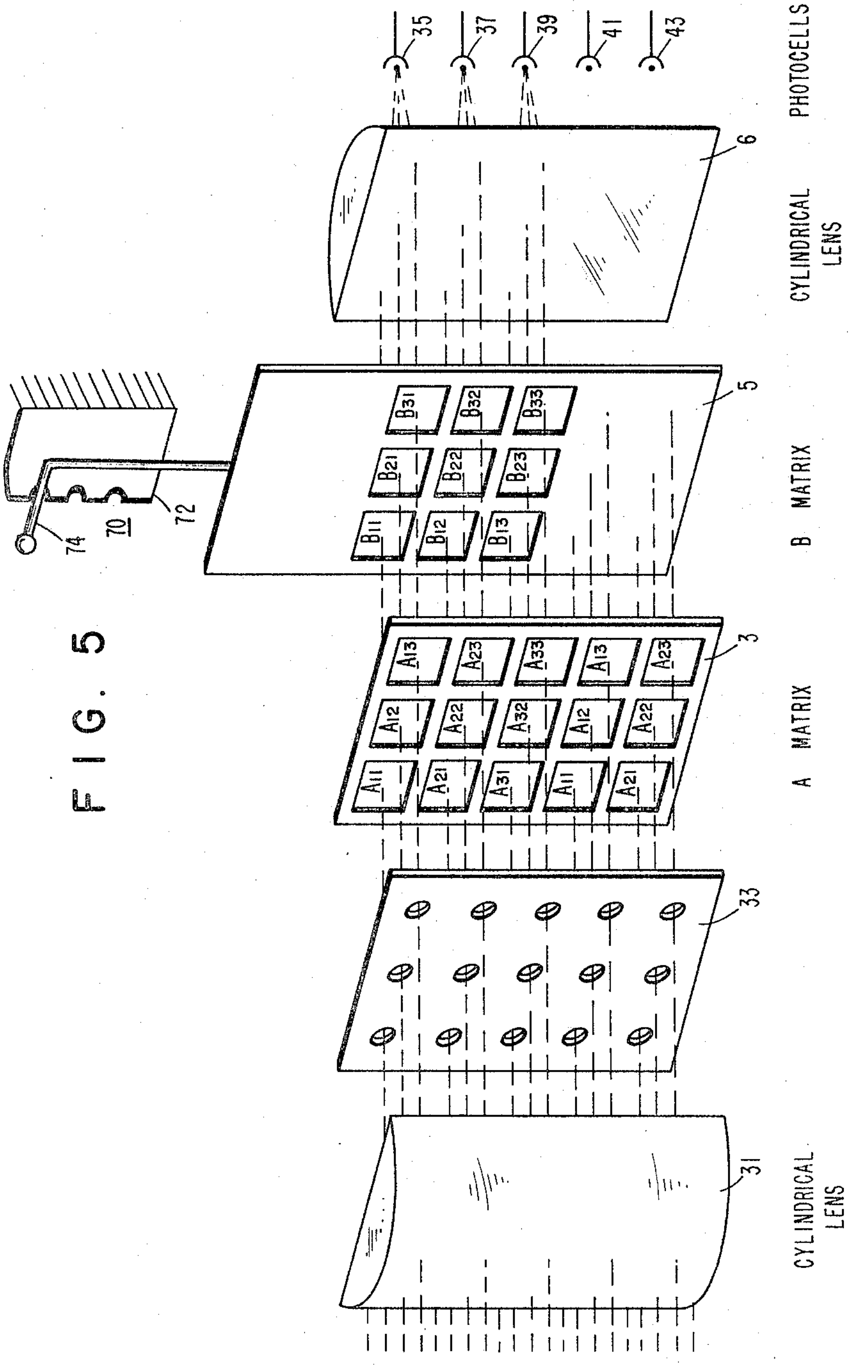
FIG. 5 illustrates, partly in perspective, a portion of the arrangement illustrated in FIG. 3.
Figure 7:
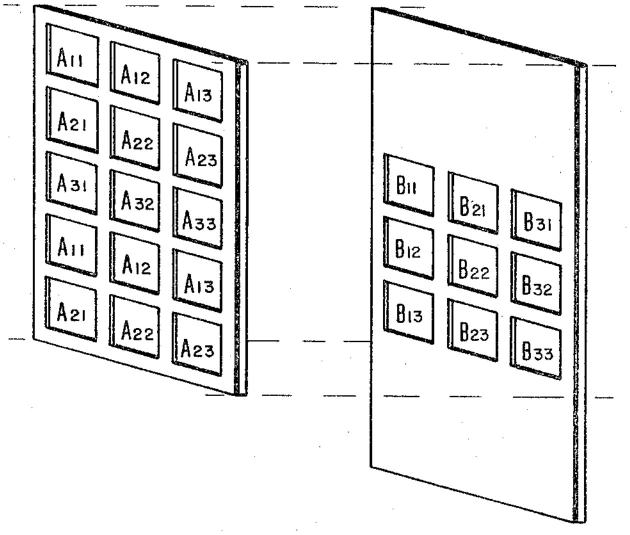

FIGS. 6 and 7, considered with FIG. 5, illustrate the relative positions of the photographic plates in FIG. 3 during a matrix multiply operation.

One arrangement for performing matrix multiplication by optical devices is shown in FIG. 1. FIG. 1 is a side view showing a light source 1, which emits collimated light rays, disposed in alignment with a pair of photographic plates 3 and 5 and an optical recorder device 7. The details of the photographic plates may be understood more readily by referring to FIG. 2*a*, which is a front view of photographic plate 3, showing a 3 x 3 matrix arrangement of light transmissive film elements 8 to 16 and 8' to 13'. It will be noted that the film elements 8 to 16 and 8' to 13' are shaded to indicate different properties of light transmissibility. These film elements or storage locations represent coded mathematical quantities disposed in accordance with a desired matrix configuration, the optical transparency of each element being proportional to the numerical value of the matrix component it represents. FIG. 2*b* is a front view showing another 3 x 3 matrix arrangement of light transmissive film elements 17 to 25.

In operation the light source emits parallel rays of light which pass through the film elements 8 through 16 and 8' through 13' of plate 3. Located on the side away from light source 1 and aligned therewith is photographic plate 5 which is shown in detail in FIG. 2*b*. Plate 5 has photographic film elements 17 through 25 disposed thereon. In the arrangement of FIG. 1 the photographic plate 5 is movable in a vertical direction to effect various alignment positions between the film elements of plate 3 and the film elements of plate 5. On plate 3 film elements 8' through 13' are identical with elements 8 through 13, respectively. An optical recorder device 7 is positioned to record the intensity of light transmitted through the aligned photographic plates 3 and 5. The amount of light transmitted through the aligned film elements is a function of the product of the quantities represented by the respective film elements.

It will be appreciated from the description of FIG. 1 that the 3 x 3 matrix of FIG. 2*a* may be multiplied by the 3 x 3 matrix of FIG. 2*b*, in accordance with the following table in which plate 3 represents the A matrix and plate 5 represents the B matrix. The optical recorder 7, receives the answer to the matrix multiplications which is represented as the C matrix in Table 1 below.

TABLE 1

| A Matrix | | B Matrix | | C Matrix |
|---|---|---|---|---|
| $A_{11}A_{12}A_{13}$ | | $B_{11}B_{12}B_{13}$ | | $C_{11}C_{12}C_{13}$ |
| $A_{21}A_{22}A_{23}$ | × | $B_{21}B_{22}B_{23}$ | = | $C_{21}C_{22}C_{23}$ |
| $A_{31}A_{32}A_{33}$ | | $B_{31}B_{32}B_{33}$ | | $C_{31}C_{32}C_{33}$ |

where:

$C_{11}=A_{11}B_{11}+A_{12}B_{21}+A_{13}B_{31}$
$C_{12}=A_{11}B_{12}+A_{12}B_{22}+A_{13}B_{32}$
$C_{13}=A_{11}B_{13}+A_{12}B_{23}+A_{13}B_{33}$
$C_{21}=A_{21}B_{11}+A_{22}B_{21}+A_{23}B_{31}$
$C_{22}=A_{21}B_{12}+A_{22}B_{22}+A_{23}B_{32}$
$C_{23}=A_{21}B_{13}+A_{22}B_{23}+A_{23}B_{33}$
$C_{31}=A_{31}B_{11}+A_{32}B_{21}+A_{33}B_{31}$
$C_{32}=A_{31}B_{12}+A_{32}B_{22}+A_{33}B_{32}$
$C_{33}=A_{31}B_{13}+A_{32}B_{23}+A_{33}B_{33}$

Figure 4:
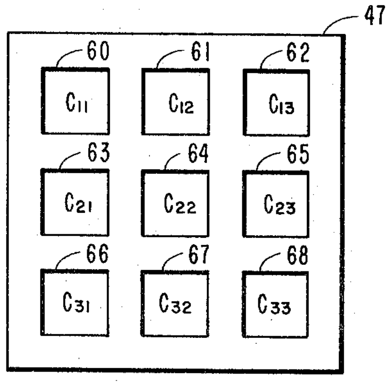
FIG. 4 illustrates a photographic plate similar to those illustrated in FIGS. 2*a* and 2*b*.

In the mathematical table above the representative quantities $A_{11}$, $A_{12}$, $A_{13}$, $A_{21}$, $A_{22}$, $A_{23}$, $A_{31}$, $A_{32}$ and $A_{33}$ correspond respectively to film elements 8 through 16 on card 3. Similarly, the mathematical representations $B_{11}$, $B_{21}$, $B_{31}$, $B_{12}$, $B_{22}$, $B_{32}$, $B_{13}$, $B_{23}$ and $B_{33}$ correspond respectively to film elements 17 through 25 on plate or card 5 shown in FIG. 2*b*. The mathematical symbols, $C_{11}$, $C_{12}$, $C_{13}$, $C_{21}$, $C_{22}$, $C_{23}$, $C_{31}$, $C_{32}$ and $C_{33}$ correspond respectively to the elements 60 through 68 of the matrix C as shown in FIG. 4 which is recorded in the optical recorder 7 of FIG. 1.

The matrix multiplication is effected by summing the products obtained when a group of individual column elements in matrix A is multiplied by a group of counterpart row elements in matrix B. The column elements in matrix B of the table above are arranged on the optical film sheet in rows instead of columns so as to register with the row elements of matrix A such that element $A_{11}$ initially coincides with $B_{11}$, $A_{12}$ initially coincides with $B_{21}$, etc. When all of the products are recorded from the initial relative position of the two matrices plates, the plate 3 is moved to a second position to enable additional permutations to take place. The complete C matrix can be determined after *n* permutations, where *n* is the order of the matrix. While a 3 x 3 matrix has been illustrated in FIG. 1, there is no limit to the size of the matrix apart from practical considerations. For example, the matrices might have 1000 elements per side. In this case to generate any one element of the C matrix, 1000 multiplications and 1000 additions would have to be performed. Simultaneously, 999 other elements of the C matrix is computed for a total of 1,000,000 multiplications and 1,000,000 additions taking place at the same time. Each time the matrices are permuted, the above process would be repeated.

FIG. 3 illustrates in more detail a system having the same basic operation as the system of FIG. 1. In FIG. 3 a light source is indicated by the numeral 30. Rays of light from light source 30 pass through cylindrical lens 31, which serves as a collimator. An aperture mask 33 further serves to collimate the light rays and assure that they are substantially parallel as they emerge to pass through plates 3 and 5, which were described previously. A series of photocell elements 35, 37, 39, 41 and 43 are positioned behind matrices plates 3 and 5 to collect the light energy passing through the aligned film elements of plates 3 and 5 and given an indication of the intensity of such light energy. A switching arrangement indicated within the broken line block 45 enables sequential sampling of the signals from photocells. The amplitudes of these signals are converted to light intensities by a cathode ray tube 49 and then recorded on a photographic plate 47 which serves as the resultant matrix C in the above example. By controlling the magnitude of the X and Y signals of the deflection circuitry of the cathode ray tube 49, the summations of the multiply operations can be stored in any desired position on photographic plate 47. Such deflection circuitry is conventional in the art, and it is not considered necessary to elaborate further on this circuitry.

In order to illustrate a matrix multiply operation according to this invention, reference is made to FIGS. 5, 6 and 7. FIG. 5 illustrates partly in perspective a portion of the system shown in block form in FIG. 3. A matrix multiply problem is performed in three steps for a multiplication of two matrices where each is a 3 x 3 matrix, as illustrated. The relative position of the plates 3 and 5 is illustrated in FIG. 5 for the first step. FIGS. 6 and 7 show the relative positions of the plates 3 and 5 for the respective second and third steps. Referring more specifically to FIG. 5, light from the apertures of the mask 33 is directed to all of the storage areas of the matrix 3. However, the matrix 5 is impervious to light except for the three rows illustrated, and light from the lower two rows of the plate 3 is blocked by the lower portion of the plate 5 whereby the photocells 41 and 43 receive no light. Light from the upper three rows of the plate 3 passes through corresponding locations of the three rows in plate 5. Light from the top row of the B matrix in plate 5 passes through a cylindrical lens 6 and is converged on the photocell 35. In like fashion light from the second row of the B matrix in plate 5 converges on the photocell 37, and light from the third or bottom row of the B matrix in plate 5 is converged on the photocell 39. Referring at this point to FIG. 3, the signal developed by the photocell 35 is conveyed through the switch 45 to control the amplitude of the light spot generated on the face of the cathode ray tube 49. At this time X and Y signals are supplied to the cathode ray tube 49 to deflect the beam and record the light intensity on storage location 60 of the plate 47, this plate being illustrated in greater detail in FIG. 4. It is assumed hereinafter that the proper X and Y signals are supplied to the cathode ray tube 49 to accomplish the correct beam deflection. The quantity thus stored represents elements $C_{11}$ of the C matrix. Next the switch 45 is connected to the photocell 37, and the intensity of this signal is converted to a light spot which is stored in storage location 64 of the photographic plate 47 shown in FIGS. 3 and 4. The storage element 64 represents the quantity $C_{22}$ of the C matrix. Next, the switch 45 in FIG. 3 is connected to the photocell 39 and the intensity of the signal from this photocell is stored in storage location 68 of the photographic plate 47 in FIGS. 3 and 4. This quantity represents the element $C_{33}$ of the matrix C. This is the end of step 1.

At this point the plate 5 in FIG. 3 is moved downwardly so that the top row of the plate 5 is aligned with the second row of the plate 3 as illustrated in FIG. 6. An arrangement for positioning the plate 5 with respect to the plate 3 is shown at 70 in FIG. 5 of the drawing which includes a detent mechanism 72 maintained in a fixed position, in any suitable manner, and an advancing lever 74 connected to plate 5 and arranged to be received in detents or notches in the detent mechanism 72. Although a manual mechanical positioning arrangement is illustrated in the drawing, it should be understood that the plates 3 and 5 may be variously positioned relative to each other by employing any suitable mechanical or electrical automatic positioning means. The switch 45 is connected to the photocell 37, and the quantity $C_{21}$ is stored in storage location 63 on the photographic plate 47 in FIGS. 3 and 4. Next, the switch 45 is connected to the photocell 39, and the quantity $C_{32}$ of the matrix C is stored at location 67 on photographic plate 47 of FIGS. 3 and 4. Next, the switch 45 in FIG. 3 is connected to the photocell 41, and the quantity $C_{13}$ is stored in storage location 62 on the photographic plate 47 in FIGS. 3 and 4. This constitutes the end of step 2.

At this point the plate 5 in FIG. 3 is moved down one row whereby the three rows of the plate 5 are aligned with the lower three rows of the plate 3 as illustrated in FIG. 7. Light from the upper two rows of the plate 3 is blocked by the impervious upper portion of plate 5, and the photocells 35 and 37 are not activated. The switch 45 is connected to the photocell 39, and the quantity $C_{31}$ is stored in storage location 66 of the photographic plate 47 in FIGS. 3 and 4. The switch 45 is connected next to the photocell 41, and the quantity $C_{12}$ is stored at location 61 of the photographic plate 47 in FIGS. 3 and 4. The switch 45 is connected next to the photocell 43, and the quantity $C_{23}$ is stored at location 65 on the photographic plate 47 in FIGS. 3 and 4. This is the end of the third step, and all of the elemental quantities for the C matrix have been determined by the light intensities from the photographic plates 3 and 5 and stored on the photographic plate 47 in FIGS. 3 and 4.

Accordingly, it is seen that matrix multiply operations may be performed according to this invention by equipment which is fast, reliable and easy to operate. Although, the foregoing illustration was made with reference to multiply operations, it is readily seen that other types of mathematical operations such as addition may be performed. In some instances the different types of mathematical operations may be performed by varying the mathematical significance assigned to the various optical transparencies in the storage locations.

While the invention has been particularly shown and described with reference to a preferred embodiment thereof, it will be understood by those skilled in the art that various changes in form and details may be made therein without departing from the spirit and scope of the invention.

What is claimed is:

1. An optical data processing device including a first optical plate having a plurality of storage locations disposed in columns and rows to form a first matrix A with each storage location being variable in transparency to represent data of a first matrix, a second optical plate having a plurality of storage locations disposed in columns and rows to form a second matrix B with each storage location being variable in transparency to represent data, means coupled to said first and second optical plates for aligning selected rows of one optical plate with selected rows of the other optical plate, said last named means serving further to selectively displace the rows of one optical plate relative to the rows of the other optical plate, a source of light disposed in alignment with said first and second optical plates for sending beams of light through corresponding aligned locations of said optical plates, means combining the light rays passing through selected locations of said first and second plates to form a plurality of products selected ones of which may be added to yield elements of a third matrix C, and means to record the combined light rays.

2. An optical data processing device including a first optical plate having a plurality of storage locations disposed in columns and rows with each storage location being variable in transparency to represent data of a first matrix, a second optical plate having a plurality of storage locations disposed in columns and rows with each storage location being variable in transparency to represent data, means coupled to said first and second optical plates for aligning selected rows of one optical plate with selected rows of the other optical plate and for selectively displacing the rows of one optical plate relative to the rows of the other optical plate, a source of light disposed in alignment with said first and second optical plates for sending beams of light through corresponding aligned locations of said optical plates, and means to combine the light rays passing through selected locations of said first and second plates, a third optical plate and means to record the combined light rays on selected locations of said third optical plate.

3. An optical data processing device including a first optical plate having a plurality of storage locations disposed in columns and rows with each storage location being variable in transparency to represent data of a first matrix A, a second optical plate having a plurality of storage locations disposed in columns and rows with each storage location being variable in transparency to represent data of a second matrix B, means coupled to said first and second optical plates for aligning selected rows of one optical plate with selected rows of the other optical plate and for displacing the rows of one optical plate relative to the rows of the other optical plate, a source of light disposed in alignment with said first and second optical plates for sending beams of light through corresponding aligned locations of said optical plates, and means to combine the light rays passing through selected locations of said first and second plates, a third optical plate having storage locations disposed in columns and rows, and means to record the combined light rays on selected storage locations of said third optical plate whereby a third matrix C is provided which represents the product of matrices A and B.

4. An optical data processing device for performing matrix multiply operations including:

(1) a first optical plate having a plurality of storage locations disposed in columns and rows with each storage location being variable in transparency to represent mathematical magnitudes of a first matrix A, the columns and rows of the first place having the format:

$$\begin{matrix} A_{11} & A_{12} & A_{13} \\ A_{21} & A_{22} & A_{23} \\ A_{31} & A_{32} & A_{33} \end{matrix}$$

(2) a second optical plate having a plurality of storage locations disposed in columns and rows with each storage location being variable in transparency to represent mathematical magnitudes of a second matrix B, the columns and rows of the second plate having the format:

$$\begin{matrix} B_{11} & B_{21} & B_{31} \\ B_{12} & B_{22} & B_{32} \\ B_{13} & B_{23} & B_{33} \end{matrix}$$

(3) first means coupled to the first and second optical plates for aligning selected rows of one optical plate with selected rows of the other optical plate, (4) a source of light disposed in alignment with said first and second optical plates for sending rays of light through corresponding aligned storage locations of said optical plates, (5) second means to combine the light rays passing through selected aligned storage locations of said first and second plates, (6) third means coupled to one of said optical plates for permuting one of said matrices with respect to the other, and (7) utilization means coupled to said second means for receiving the combined light rays as individual elements which may be processed to form a third matrix C having the format:

$$\begin{matrix} C_{11} & C_{12} & C_{13} \\ C_{21} & C_{22} & C_{23} \\ C_{31} & C_{32} & C_{33} \end{matrix}$$

References Cited by the Examiner

UNITED STATES PATENTS

| | | | |
|---|---|---|---|
| 2,757,865 | 8/1956 | Toulon | 235—61.11 |
| 3,042,912 | 7/1962 | Gilbert | 340—347 |
| 3,068,361 | 12/1962 | Lannan | 350—217 |

MAYNARD R. WILBUR, *Primary Examiner.*

A. L. NEWMAN, *Assistant Examiner.*